(12) United States Patent
De Vor (10) Patent No.: US 7,195,076 B2
(45) Date of Patent: Mar. 27, 2007

(54) HOOF TRIMMING STALL

(76) Inventor: Albert De Vor, R.R. #4, 403745 Union Rd., Ingersoll (CA) N5C 3J7

( * ) Notice: Subject to any disclaimer, the term of this patent is extended or adjusted under 35 U.S.C. 154(b) by 75 days.

(21) Appl. No.: 11/185,816

(22) Filed: Jul. 21, 2005

(65) Prior Publication Data

US 2007/0017455 A1 Jan. 25, 2007

(51) Int. Cl.
*A01L 11/00* (2006.01)
*A01K 1/00* (2006.01)
*A01K 15/04* (2006.01)

(52) U.S. Cl. .................. 168/48.1; 119/516; 119/738

(58) Field of Classification Search .............. 168/48.1, 168/48.2; 119/516, 518, 522, 729, 734, 738, 119/743, 726, 752
See application file for complete search history.

(56) References Cited

U.S. PATENT DOCUMENTS

| | | | | |
|---|---|---|---|---|
| 2,000,122 A | | 5/1935 | Cameron | |
| 2,278,298 A | * | 3/1942 | Young | 119/726 |
| 2,672,126 A | * | 3/1954 | Linton | 119/752 |
| 2,718,214 A | * | 9/1955 | Walker | 119/726 |
| 4,201,157 A | | 5/1980 | Lambert | |
| 4,214,555 A | | 7/1980 | Sawby | |
| 4,531,478 A | | 7/1985 | Forrest | |
| 4,567,854 A | | 2/1986 | Burns | |

(Continued)

FOREIGN PATENT DOCUMENTS

| | | |
|---|---|---|
| CA | 1063446 | 10/1979 |
| SE | 8600207 | 4/1989 |

(Continued)

OTHER PUBLICATIONS

KVK Hydra. Klov. Hoof Trimming Chute Internet extract www.kvk.dk/English.htm (Apr. 20, 2005).

(Continued)

*Primary Examiner*—Son T. Nguyen
(74) *Attorney, Agent, or Firm*—Standley Law Group LLP (57) ABSTRACT

A hoof trimming stall has a front gate having two pivotally mounted spaced-apart doors for swinging inwardly and outwardly. The doors are movable between a catching position in which the doors point inwardly for receiving a head of the animal entering the stall, a closed position for holding the animal in the stall with the neck of the animal caught in a gap between the doors, and an open position in which the doors point outwardly for permitting the animal to exit. A door lock/release mechanism has a slider arm movable forward and backward, a hydraulic cylinder for moving the slider arm forward and backward, a rear catcher mounted on the slider arm for preventing the doors from moving from the closed position to the catching position, a front catcher mounted on the slider arm for preventing the doors from being opened by the animal when the doors are in the closed position, and a release mechanism for permitting the doors to move from the open position to the catching position. An automatic reset mechanism automatically resets the doors and door/lock release mechanism. The reset mechanism has a sensor for signaling the hydraulic cylinder to move the slider arm backwards when the doors are in the open position and a spring for biasing the doors from the open position to the catching position.

15 Claims, 9 Drawing Sheets

U.S. PATENT DOCUMENTS

| | | |
|---|---|---|
| 4,829,937 A | 5/1989 | Weelink |
| 5,213,061 A | 5/1993 | Zito |
| 5,282,441 A | 2/1994 | Ricketts |
| 5,331,923 A | 7/1994 | Mollhagen |
| 5,441,016 A | 8/1995 | Ricketts |
| 5,483,921 A * | 1/1996 | Waybright ............... 119/14.02 |
| 5,640,933 A | 6/1997 | Bradbury |
| 5,669,332 A | 9/1997 | Riley |
| 5,915,334 A | 6/1999 | Cummings et al. |
| 6,213,058 B1 | 4/2001 | Byl |
| 6,609,480 B2 | 8/2003 | Daniels et al. |
| 6,698,812 B1 | 3/2004 | Stubbs |
| 2004/0194734 A1 | 10/2004 | Fisher |

OTHER PUBLICATIONS

The Hydraulic Comfort Chute. Comfort Hoof Care Inc. Internet extract www.comforthoofcare.com/AutoChut.htm (Apr. 20, 2005).

Ideal Hoof Trimming Stall. Ideal Machinery. Internet extract www.wicideal.com/Pages/hoof_trimming.htm (Apr. 20, 2005).

DeVor's Deluxe Hoof Trimming Chute brochure (Feb. 2004).

* cited by examiner

HOOF TRIMMING STALL

FIELD OF THE INVENTION

This invention is related to hoof trimming stalls for hoofed animals such as cattle, horses and the like.

BACKGROUND OF THE INVENTION

Large hoofed animals in a farm setting frequently require hoof trimming. Due to the size and weight of such animals, in order to trim their hooves safely, the animals are usually immobilized in a stall before hoof trimming is commenced. Although many commercial stalls are available for this purpose, currently available commercial stalls generally suffer from one or more disadvantages. For example, such stalls may not be portable. They may not securely immobilize the animal. Loading animals into such stalls may not be easy and/or quick. The stalls may not provide easy and/or quick access to the animal's hooves. Unloading animals from such stalls may not be easy and/or quick. As a result, precious time is lost during the hoof trimming operation resulting in fewer animals that can have their hooves trimmed in a given period time.

De Vor's Deluxe Hoof Trimming Chute as advertised in a brochure of February 2004 by De Vor Enterprises shows a stall having many advantageous features. While that chute represented an improvement over existing hoof trimming stalls of that time, there remains a need in the art for a stall that provides improved security, convenience, versatility and/or throughput.

SUMMARY OF THE INVENTION

As used in the specification and the appended claims, the singular forms "a," "an" and "the" include plural referents unless the context clearly dictates otherwise.

In accordance with the present invention, there is provided a hoof trimming stall comprising: a frame having a rear portion through which a four-legged hoofed animal may enter the stall and a front portion through which the animal may exit the stall; a front gate on the front portion of frame, the front gate having two pivotally mounted spaced-apart doors for swinging inwardly into the stall and outwardly away from the stall, the doors movable between a catching position in which the doors point inwardly for receiving a head and neck of the animal entering the stall in a gap between the spaced-apart doors, a closed position for holding the animal in the stall with the neck of the animal caught in the gap between the doors, and an open position in which the doors point outwardly for permitting the animal to exit the stall; a door lock/release mechanism having a slider arm movable forward and backward with respect to the frame, actuating means connected to the frame for moving the slider arm forward and backward, a rear catcher mounted on the slider arm for preventing the doors from moving from the closed position to the catching position, a front catcher mounted on the slider arm for preventing the doors from being opened by the animal when the doors are in the closed position, and a release mechanism for permitting the doors to move from the open position to the catching position; and, an automatic reset mechanism for automatically resetting the doors and door/lock release mechanism, the reset mechanism having a sensor for signaling the actuating means to move the slider arm backwards when the doors are in the open position to thereby reset the door lock/release mechanism, and a biasing means connected to the doors and the frame for biasing the doors from the open position to the catching position to thereby reset the doors.

The front and rear catchers prevent the doors from moving outwardly or inwardly when the doors are in the closed position. There will be some "play" between the catchers since the catchers cannot be too tightly spaced as to cause the doors to bind when they are allowed to move to the open position or back to the catching position. The rear catcher is preferably pivotally mounted on the slider arm. Similarly, the front catcher is preferably pivotally mounted on the slider arm. Pivoting catchers facilitate automatic resetting of the doors after the animal exits the stall.

The release mechanism permits the doors to move from the open position back to the catching position. Preferably, the release mechanism comprises a pair of interacting elements, for example plates, wherein one member causes the other member to shift the position of a catcher out of the way of the doors. More preferably, the release mechanism comprises a lift plate connected to the rear catcher for engagement with the front catcher and/or a push plate connected to the front catcher for engaging the rear catcher. Even more preferably, the release mechanism comprises a lift plate connected to the rear catcher and a push plate connected to the front catcher for engaging the rear catcher to release the rear catcher as the doors move from the open position to the catching position.

The doors preferably comprise rollers mounted thereon to engage the rear catcher to permit movement of the doors without binding when the doors move from the catching position to the closed position. The rollers are preferably located at the top of the doors. The rollers may also help prevent binding of the doors when the doors move from the closed position to the open position.

Preferably, the doors also have a half-release position between the closed position and the open position. The half-release position provides enough room for the animal to start pushing through the doors to exit the stall. As a result of the animal pushing through the doors at the half-release position, the doors move from the half-release position to the open position allowing the animal to exit fully from the stall. To move the doors to the half-release position, the stall preferably comprises a controller for permitting selective activation of the actuating means, preferably a hydraulic cylinder, for moving the slider arm and doors forward from the closed position to the half-release position.

Automatic resetting of the stall as the animal exits is preferably activated only after the doors are pushed past the half-release position by the animal. This prevents spooking of the animal who might try to retreat back into the stall if the slider arm starts to move and under pressure from the biasing means connected to the doors. The biasing means may be any suitable means, for example, another hydraulic cylinder, a spring, etc. A spring is particularly preferred.

The stall preferably comprises means for preventing an animal from backing out of the stall. For example, straps, chains or arm elements may be used. Preferably, the stall comprises a rear swing arm for blocking the rear portion of the frame to help prevent the animal from backing out of the stall.

The stall preferably has leg supports for suspending the front and rear legs at a higher level for convenience of trimming. For example, straps, chains and/or platforms may be used. The front legs are preferably supported on platforms to which the legs are secured by leg holders (e.g. straps, ropes). The rear legs are preferably supported one at a time by a strap or chain secured to the leg. The means for suspending the legs may be height adjustable.

The stall also preferably has an animal lift for supporting the animal while its legs are raised for trimming. The animal lift is preferably adjustable to accommodate animals of different size. The animal lift preferably comprises adjustable arms and a belly strap attached to the arm. The animal lift is preferably hydraulically activated by one or more hydraulic cylinders.

The stall preferably comprises a floor. The floor is preferably vertically movable, preferably to raise and lower the entire stall to a convenient height. Vertical movement of the floor is preferably accomplished by a floor lift, for example one or more hydraulic cylinders. The floor may be supported on vertically adjustable legs, or may be supported directly by a hydraulic jack.

Preferably, the animal lift and the floor lift are separately controllable. Both the animal lift and the floor lift are preferably controlled by separate worker/slave hydraulic cylinders.

The stall is preferably portable in that it may be conveniently taken from site to site. Preferably, the stall comprises wheels connected to the frame and a removable hitch to permit towing of the stall. Preferably, the wheels are mounted on an axle. More preferably, the axle may be raised and lowered.

The hoof trimming stall of the present invention provides faster throughput of animals. The stall is particularly useful for cattle and horses.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Referring generally to the Figures, a hoof trimming stall has a frame including front side support struts 1, rear side support struts 2, roof 3 and floor 4. Front gate 10 mounted at the front of the stall has two side-by-side spaced-apart doors 11 shown in a catching position in FIG. 1. Doors 11 are constructed of cylindrical pipes and are pivotally mounted on the frame at fixed points at the top and bottom alongside front side support struts 1 so that the pivot axis is parallel to front side support struts 1. The doors comprise vertical head rails 13 adjustably attached to head plates 14 proximal the top and pivotally attached to the doors at the bottom. The head rails define a gap between the doors, which is large enough in the catching position to accommodate the head of animal but small enough to prevent the entire animal from passing completely between the doors in the catching position. When an animal enters the stall from the rear, the animal's head passes through the gap and the animal's shoulders push the doors to a closed position wherein the doors are coplanar and the animal's neck is caught in the gap between the doors.

Figure 5:
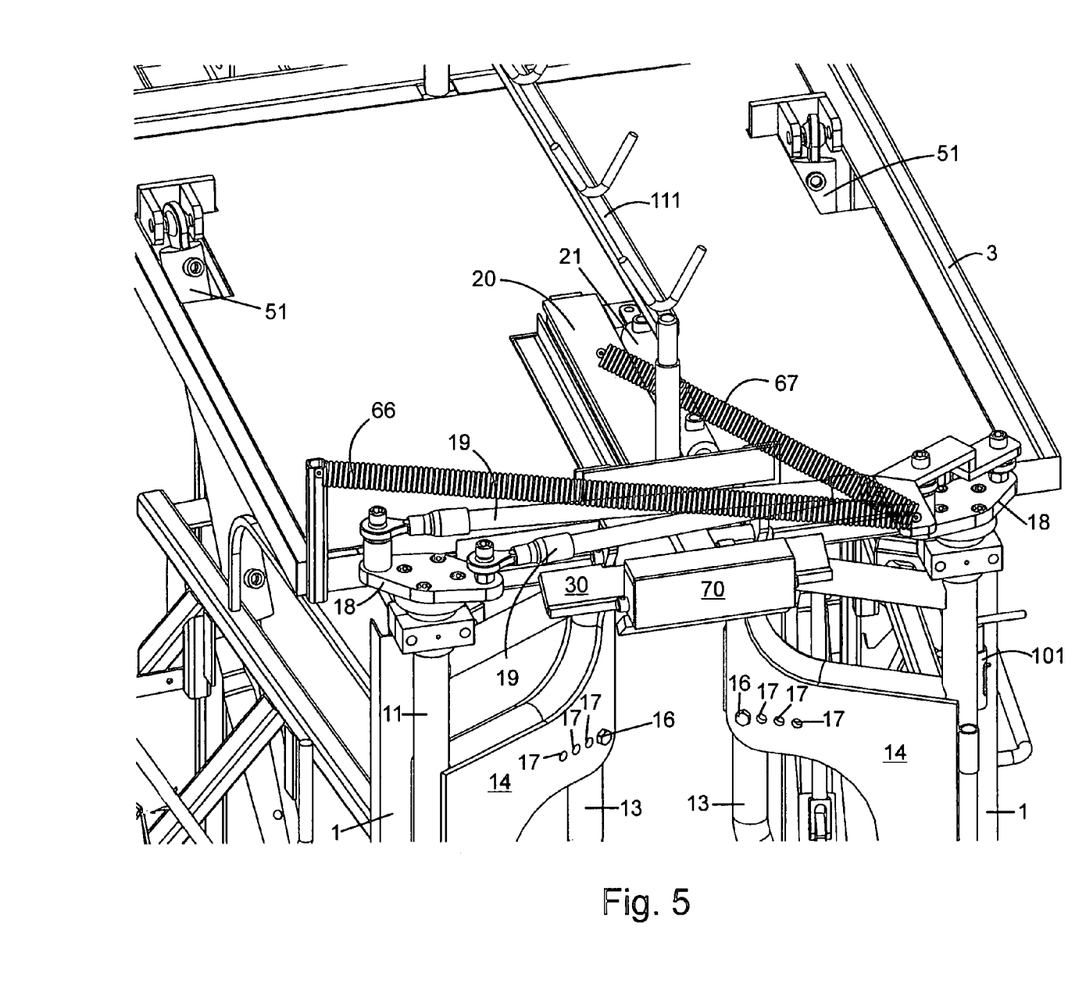
FIG. 5 is a magnified top front view of the hoof trimming stall of FIG. 1 at the top of the doors.
Figure 6:
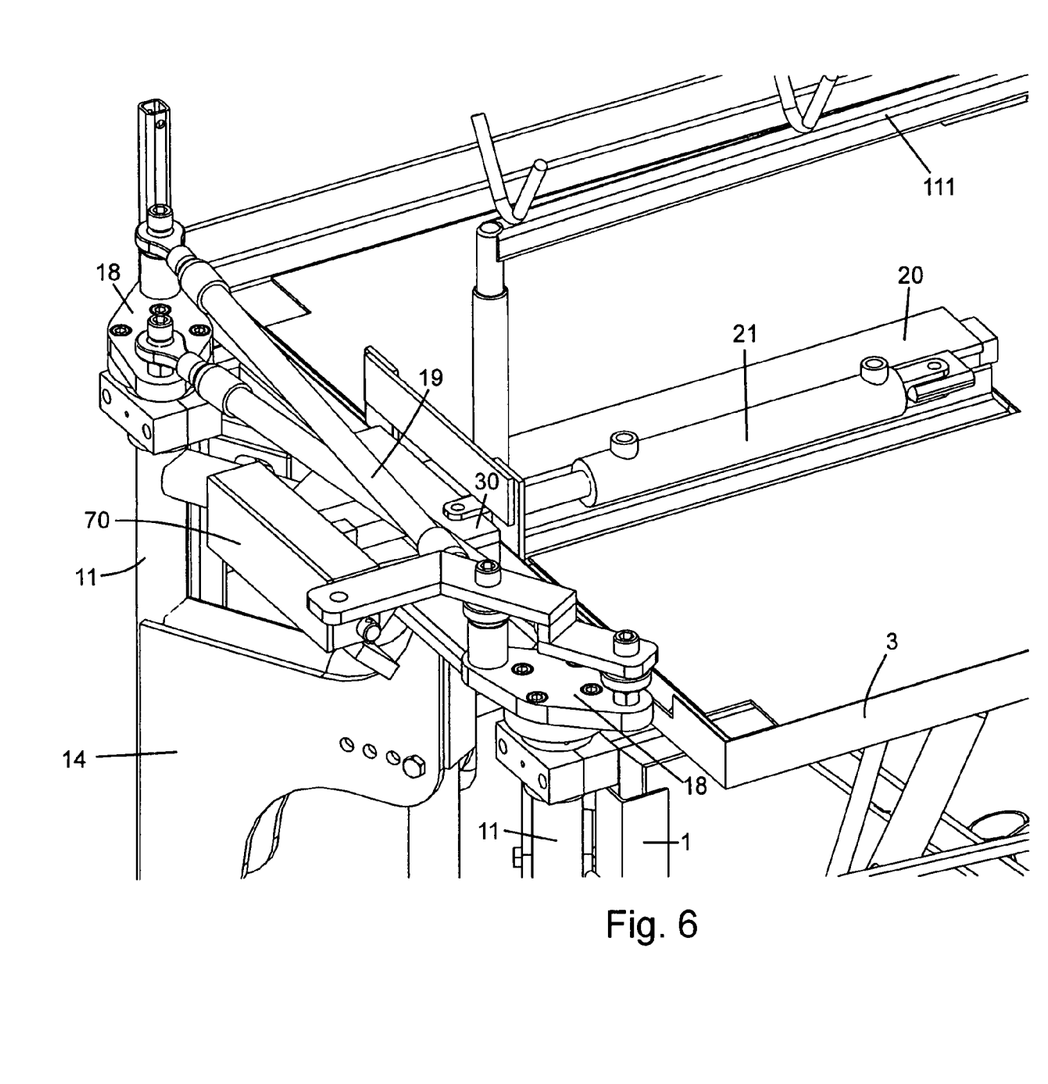
FIG. 6 is a magnified top left front view of the hoof trimming stall of FIG. 1 at the top of the doors.
Figure 7:
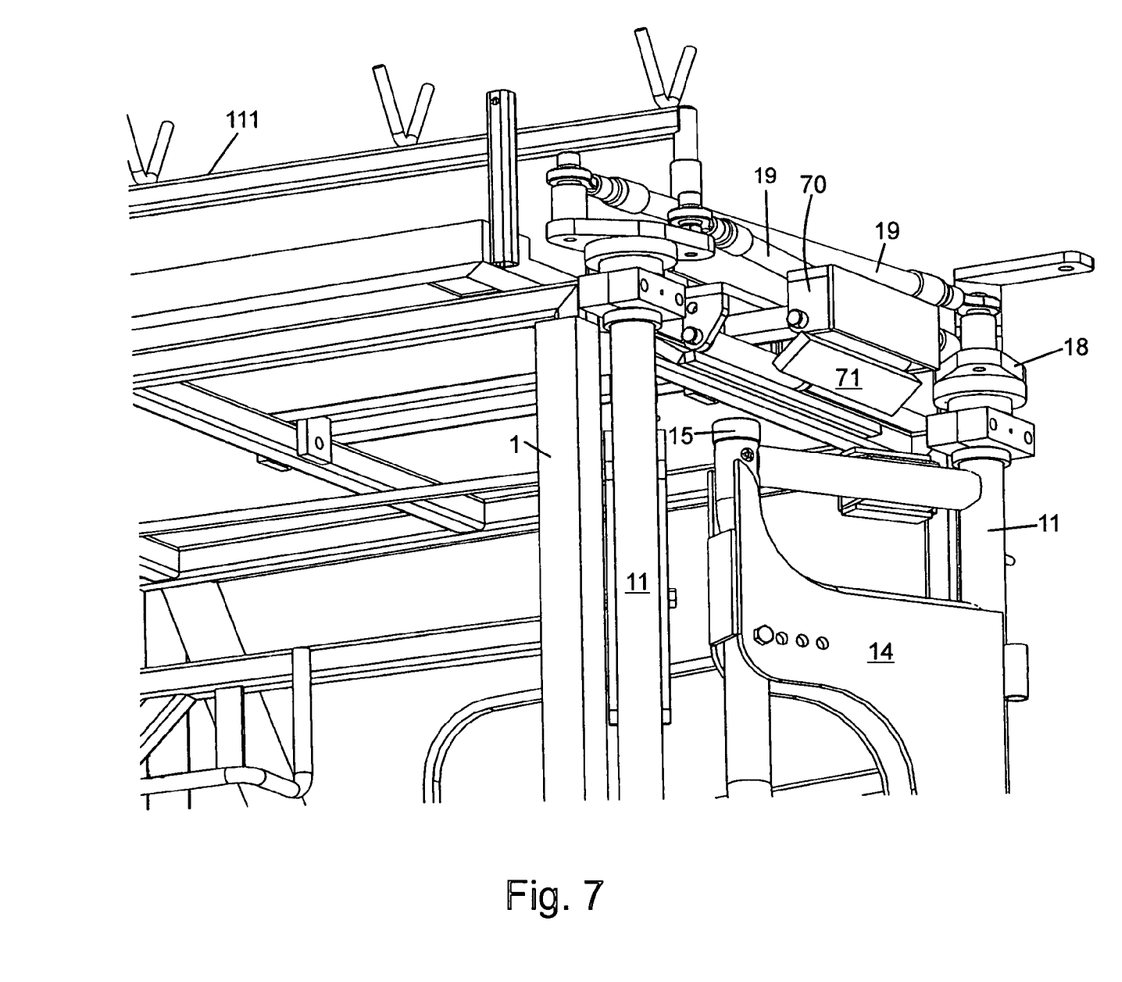
FIG. 7 is a magnified bottom right front view of the hoof trimming stall of FIG. 1 at the top of the doors.

Referring specifically to FIGS. 5, 6 and 7, close-up views of the top of doors 11 show head rails 13 attached to head plates 14 by means of pins 16 through one of a plurality of holes 17 in each head plate 14. The size of the gap between the head rails may be adjusted by securing the head rails in the head plates at different holes. Rollers 15 are rotatably mounted on top of head rails 13. Doors 11 pivot on gate drive plates 18 that are attached to swing arms 19. Swing arms 19 ensure coordination of the doors as they swing outward or inward.

Referring generally to the Figures, a door lock/release mechanism comprises slider arm 20 slidably attached to the frame on the roof. The slider arm may be moved backward and forward by hydraulic cylinder 21 attached to the slider arm and the roof. Rear catcher 30 and front catcher 70 are pivotally mounted on the slider arm. Rollers 15 are rearward of rear catcher 30 when doors 11 are in the catching position. As the doors move from the catching position to the closed position, doors 11 engage the rear side of rear catcher 30 causing the rear catcher to pivot up and away from the doors to permit the doors to pass under the rear catcher into the closed position. Rollers 15 ensure that the doors do not bind on the rear catcher as the doors engage the rear catcher. Once the doors move from the catching position to the closed position, front catcher 70 prevents the animal from pushing the doors outward and rear catcher 30 prevents the doors from moving inward. Thus, the doors are locked in the closed position with the animal's neck between head rails 13.

Figure 8:
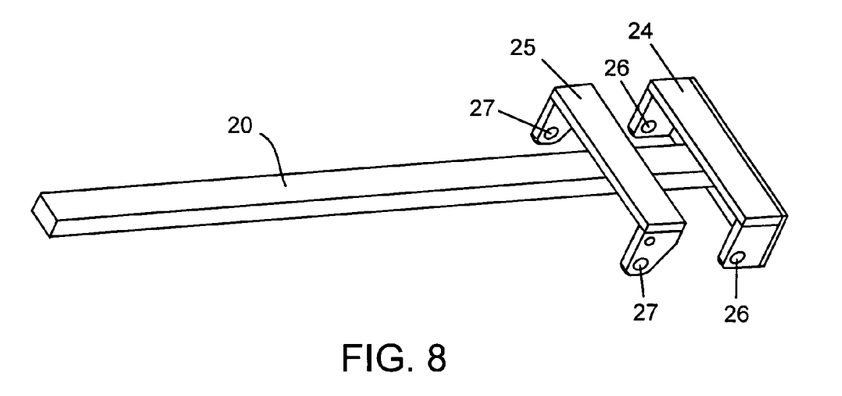
FIG. 8 depicts a slider arm used on the hoof trimming stall of FIG. 1.
Figure 9:
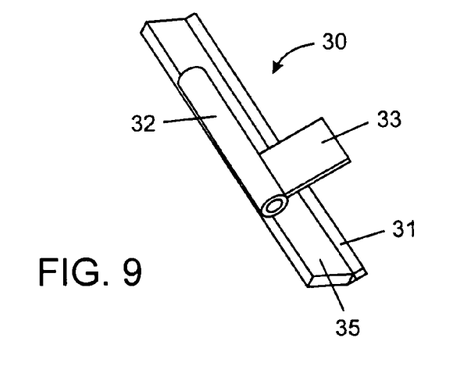
FIG. 9 depicts a rear catcher used on the hoof trimming stall of FIG. 1.
Figure 10:
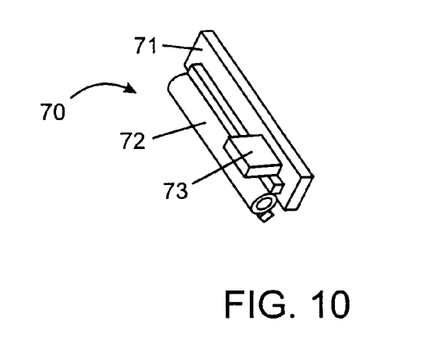
FIG. 10 depicts a front catcher used on the hoof trimming stall of FIG. 1.

Details of slider arm 20, rear catcher 30 and front catcher 70 are shown specifically in FIGS. 8, 9 and 10. Slider arm 20 comprises front catcher holder 24 and rear catcher holder 25 fixedly attached to the slider arm at the end and inward from the end, respectively. Rear catcher 30 comprises rear horizontal catcher bar 31 having angled portion 35, sleeve 32 and lift plate 33. Rear catcher 30 is pivotally mounted to the slider arm by a pin through sleeve 32 and through apertures 27 of rear catcher holder 25 on the slider arm. Angled portion 35 permits the doors to more easily cause the rear catcher to pivot up and away from the doors as the doors move from the catching position to the closed position as described above. Front catcher 70 comprises front horizontal catcher bar 71, sleeve 72 and push plate 73. Front catcher 70 is pivotally mounted to the slider arm by a pin through sleeve 72 and through apertures 26 of front catcher holder 24 on the slider arm. The front and rear catchers are depicted upside down to better illustrate the elements of which they comprise.

Push plate 73 and lift plate 33 together form a release mechanism for disengaging rear catcher 30 to permit the doors to move to the catching position. Push plate 73 of the front catcher engages lift plate 33 of the rear catcher when the front catcher pivots in response to the doors moving toward the catching position as more fully described below. Pivoting of the front catcher up and away as the doors move toward the catching position causes push plate 73 to push on lift plate 33 thereby causing rear catcher bar 30 to pivot up and out of the way of the doors as the doors pass beneath the catchers. Rear catcher 30 may also be equipped with a safety handle (not shown) to pivot the rear catcher manually so that the doors may be allowed to move to the catching position.

Figure 1:
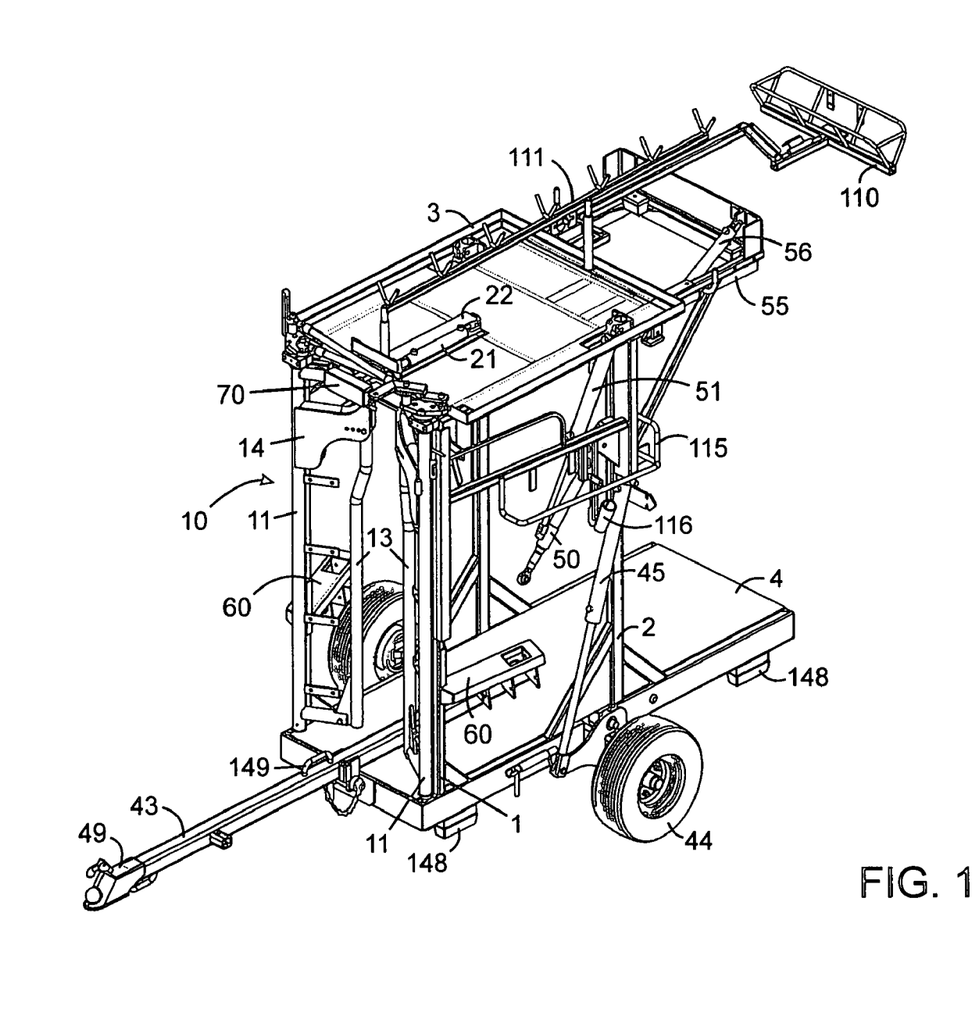
FIG. 1 is a top left front side perspective view of a hoof trimming stall of the present invention.
Figure 2:
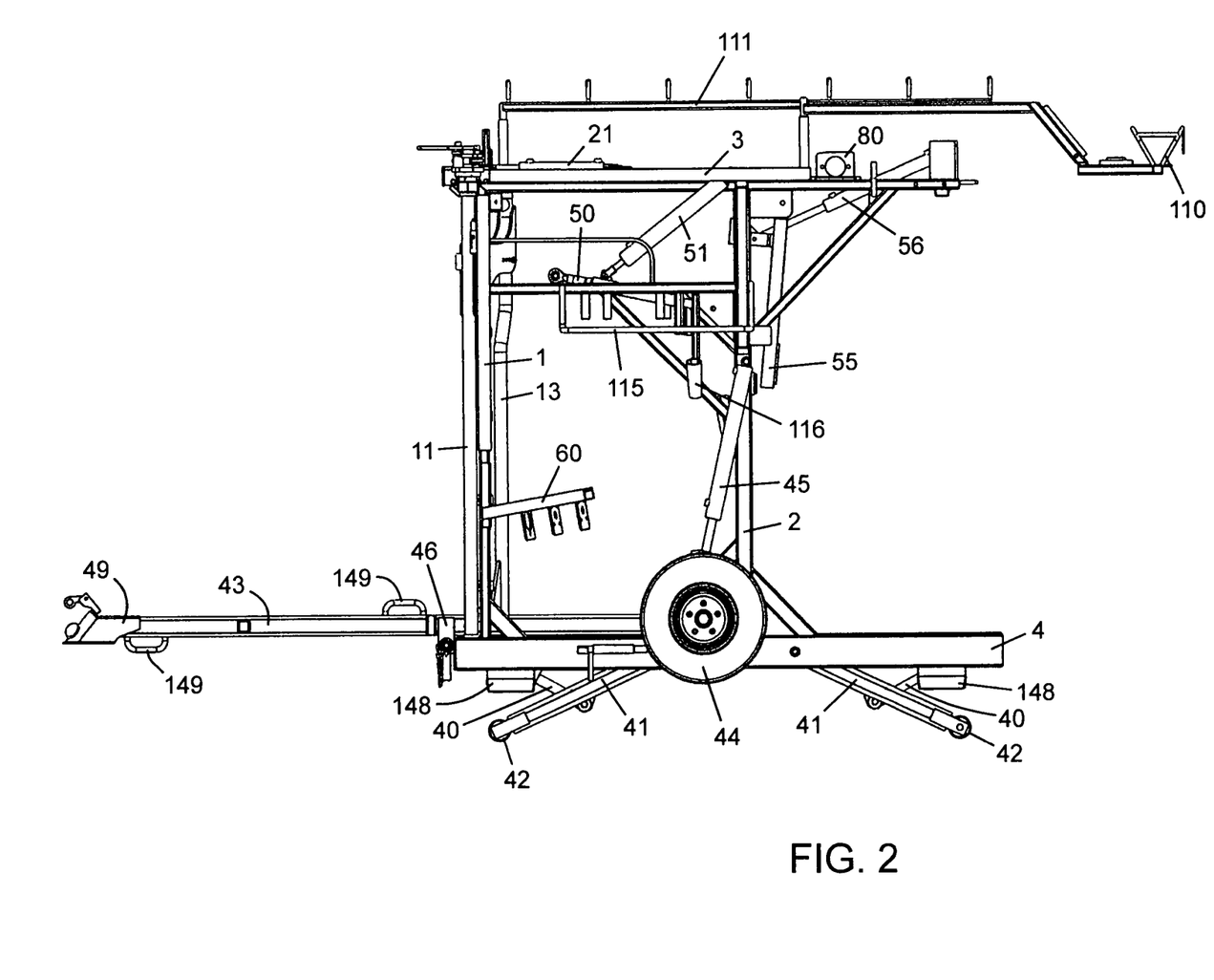
FIG. 2 is a left side view of the hoof trimming stall of FIG. 1.
Figure 3:
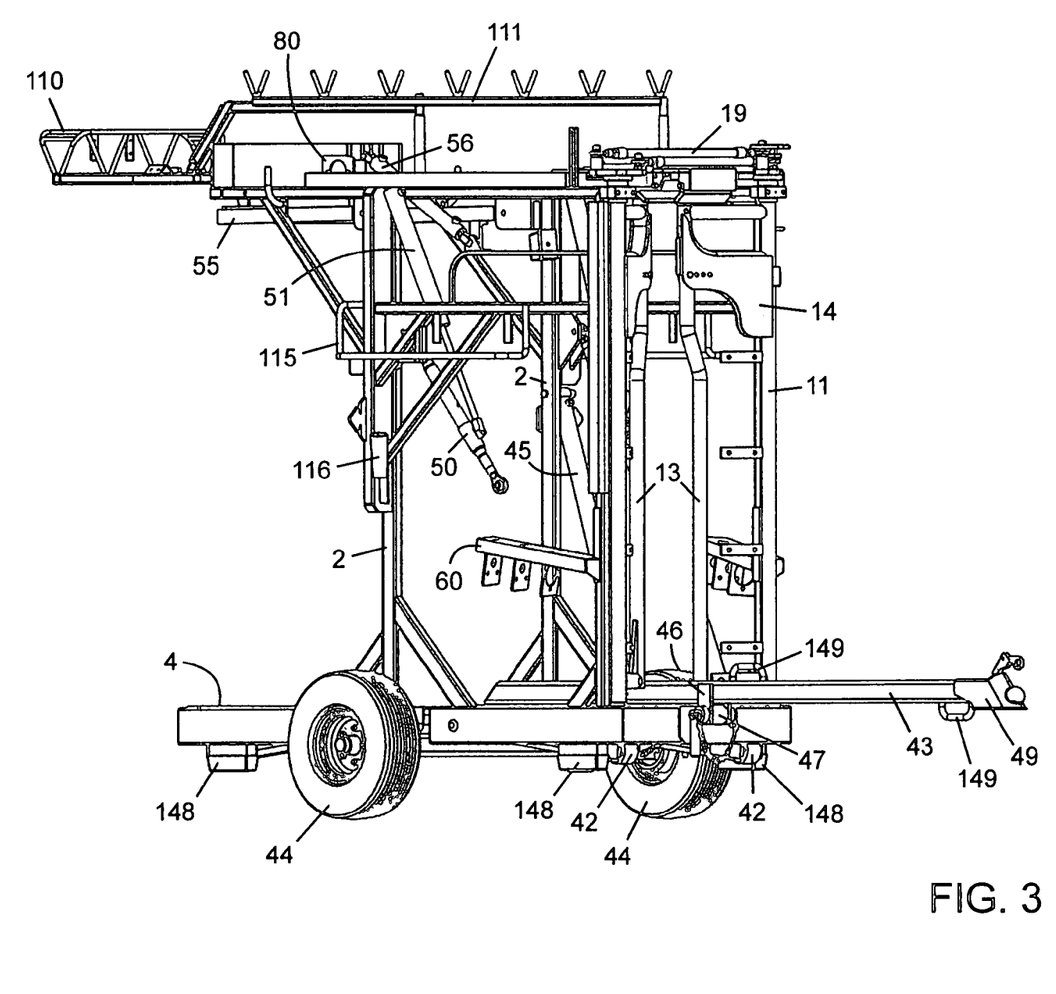
FIG. 3 is a right front side perspective view of the hoof trimming stall of FIG. 1.

With an animal in the stall in the closed position, the stall may be raised to a comfortable height by action of hydraulic cylinders 40 attached to floor 4 and lifting legs 41. Lifting legs 41 are connected at a scissors linkage and wheels 42 at the ends of legs 41 permit the legs to ride easily along the ground as hydraulic cylinders 40 push the legs closer together thereby raising the stall higher off the ground. One hydraulic cylinder is a master with the other a slave. It should be noted that removable hitch 43 is removed before loading animals. Trailer wheels 44 are raised off the ground by virtue of hydraulic cylinder 45 attached to a liftable axle 140 on which wheels 44 are mounted. Thus, floor 4 can be as close to the ground as legs 41 will permit in order to load the animal in the first place. When the stall is as close to the ground as possible, it rests on the ground on feet 148. Raising of the stall lifts wheels 44 further off the ground. FIG. 1 depicts the stall with trailer wheels 44 in the lowered position for transporting the stall and FIG. 2 depicts the stall with trailer wheels 44 in the raised position.

With an animal in the stall in the closed position, a belly band (not shown) attached to adjustable support arms 50 is slung under the belly of the animal behind the front legs of the animal. The support arms are attached to hydraulic cylinders 51, which are attached to the frame. One of the cylinders 51 is a master and the other a slave. The animal is supported by the belly band which is raised and lowered by the support arms in response to actuation of the hydraulic cylinders. The support arms are adjustable in length to accommodate different seized animals. Rear end swing arm 55 pivotally attached to the frame may be swung down behind the animal by means of hydraulic cylinder 56 to prevent the animal from backing out of the stall. Once the animal leaves the stall, hydraulic cylinder 56 raises swing arm 55 so that another animal may enter the stall.

Attached to front side struts 1 are front leg trimming platforms 60 set at a height where a typical sized animal can comfortably have its leg set in a tucked-under position. Front leg holders (e.g. straps or ropes) (not shown) are used to secure the front legs on the trimming platforms. The front hooves may then be trimmed. One of the back legs of the animal may also be lifted and placed in a rear leg support chain or strap (not shown) to suspend the rear leg at a comfortable height for trimming the hoof. The rear leg support chain or strap is suspended from a roller (not shown) for ease of raising and lowering. After the rear hoof of the suspended leg is trimmed, the rear leg support may be used on the other rear leg so that the hoof on the other rear leg may be trimmed. After trimming all of the hooves, the front and back legs are released and the belly band removed from around the animal.

To release the animal from the stall, doors 11 are selectively opened by an attendant by activating hydraulic cylinder 21 to move slider arm 20 forward which pushes the doors open to a half-release position. The doors are pushed open by virtue of the front face of rear catcher 30 pushing against rollers 15. The doors are not blocked by front catcher 70 since the front catcher also moves with the slider arm. As the doors swing open to the half-release position, the rollers get farther apart until at some point they are farther apart than the length of front catcher 70. Since rear catcher 30 is longer than front catcher 70, the rollers continue to engage the rear catcher in the half-release position to prevent the doors from moving inward. The animal is then encourage to push forward thereby pushing the doors open to an open position, which is wide enough for the entire animal to exit through the front of the stall.

Figure 11A:
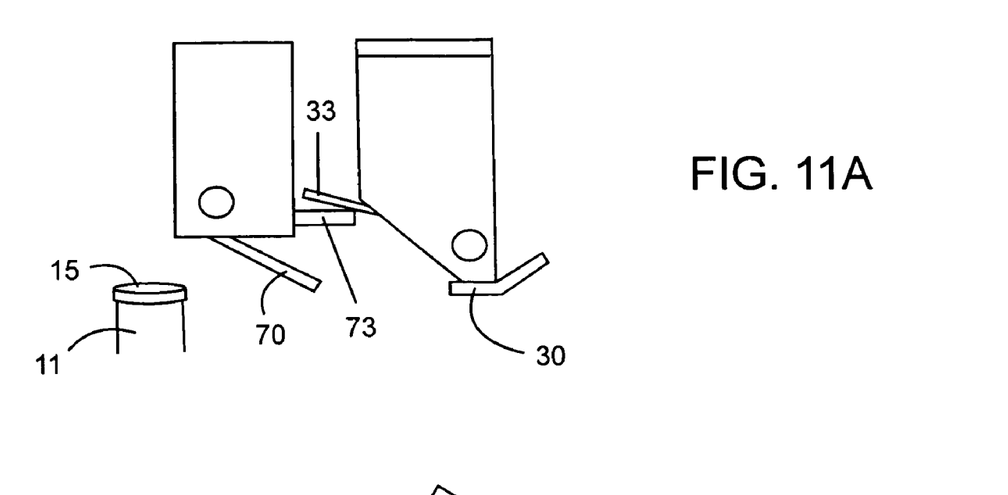
FIGS. 11A to 11C are a schematic diagram illustrating the positions of front and rear catchers as doors are being reset to a catching position.
Figure 11B:
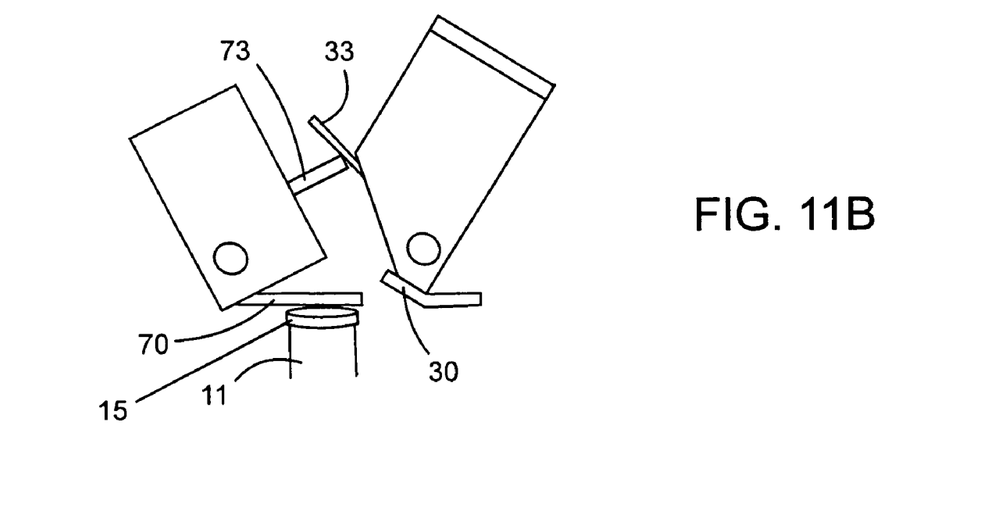
Figure 11C:
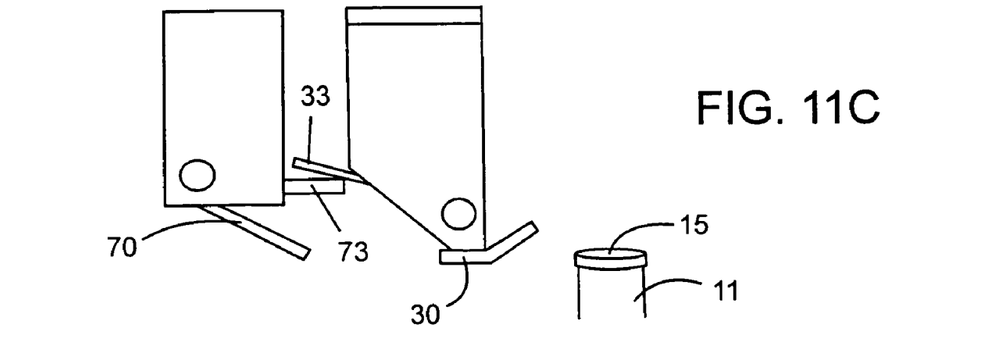

When doors 11 are pushed past the half-release position by the animal exiting the stall, laser sensor 65 mounted on one of the doors 11 below gate drive plate 18 detects the opening of the doors and signals hydraulic cylinder 21 to retract thereby moving slider arm 20 backwards to reset the slider arm in its original position. Once the animal has fully exited the stall, doors 11 are pulled back toward the catching position by springs 66,67 (only shown in FIG. 5) connected to swing arms 19. With specific reference to FIGS. 11A to 11C, as the doors engage the front face of front catcher 70, the front catcher pivots up and away from the moving doors. Pivoting of the front catcher causes push plate 73 to push against lift plate 33 of rear catcher 30 thereby causing rear catcher 30 to pivot up and out of the way of the doors. The doors may then pass beneath both the front catcher and the rear catcher to reach the catching position. Once the doors have fully passed the catchers, both catchers pivot back to their original positions. In this manner, resetting of the front gate is accomplished automatically, saving considerable time.

Figure 4:
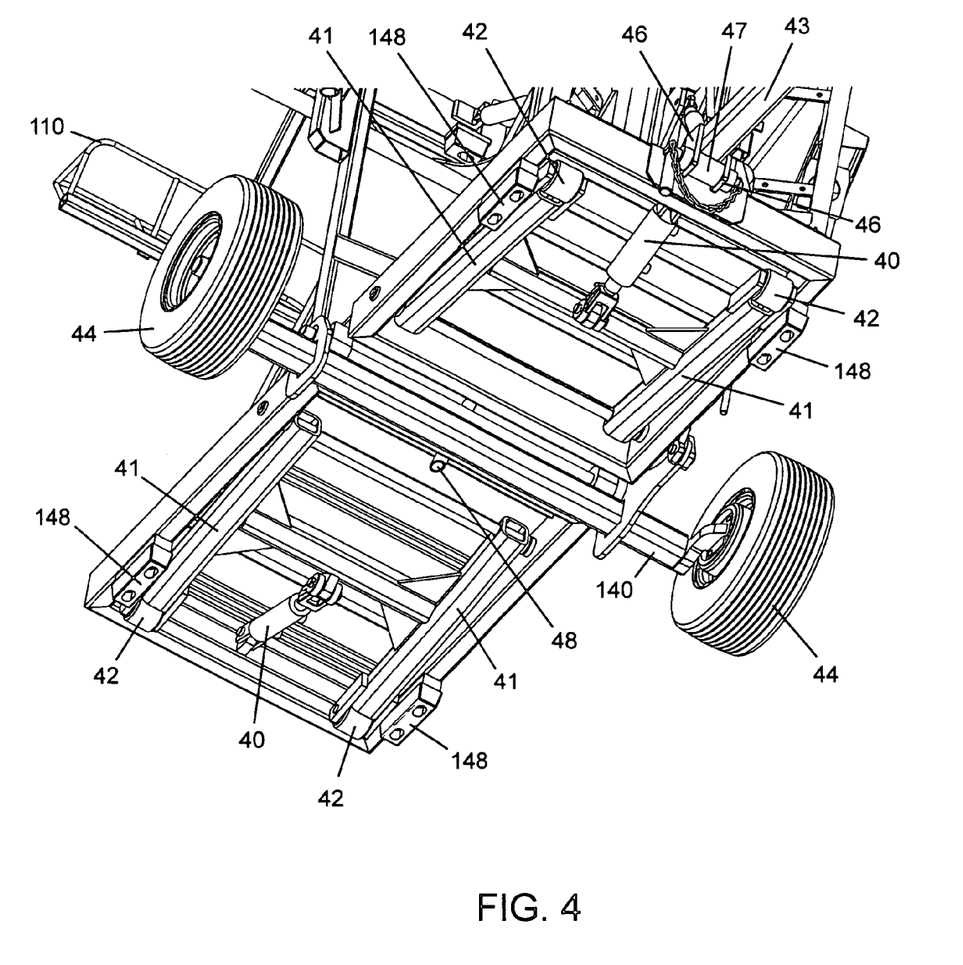
FIG. 4 is a bottom perspective view of the hoof trimming stall of FIG. 1.

When the stall is being used to trim an animal's hooves, hitch 43 is removed and trailer wheels 44 are raised off the ground as explained previously. For transportation, wheels 44 may be lowered by means of hydraulic cylinder 45 attached to the liftable axle and hitch 43 can be quickly and conveniently mounted on to floor 4 of the stall. As shown generally in the Figures, with special reference to FIG. 4, hitch 43 comprises a pair of spaced-apart brackets 46 with aligned apertures for receiving a pin and hitch pin 48 for insertion into an aperture in floor 4 of the stall. To mount the hitch, hitch pin 48 is inserted into the aperture in floor 4 and the spaced-apart brackets are fitted over sleeve 47 mounted at the front of the frame. A pin is inserted through the aligned apertures of the brackets and through the sleeve to secure the hitch to the stall. Cotter pins, chains or other safety devices may be used to ensure that the pin does not release from brackets 46 and sleeve 47 during transport. Hitch 43 also comprises trailer ball mount 49 and handles 149. The hitch may also comprise a trailer wheel, particularly if the hitch is very long.

All of the hydraulic cylinders are operated by a 5 horsepower motor 80 mounted on roof 3. The motor actuates the hydraulic cylinders with a 7 gallon oil pump. For operating all solenoids on the motor and hydraulic cylinders, a 1-phase 220 V to 3-phase 110 V transformer is used. All of the lifting functions of the stall are electrically controlled and controlled separately. This provides the ability to adjust the height of the stall for worker convenience while providing the ability to manipulate the animal to whatever position is desired.

The stall comprises a number of other advantageous features. Door holder 101 comprising a pin and sleeve mechanism may be used to hold the doors in the open position for transport. Swingable lighting tower 110 having lights mounted thereon provides lighting from any number of angles and positions. Electrical cord boom 111 supports electrical cord for 220 V service. Control box racks 115 on both sides of the stall support control boxes (not shown) on both sides of the stall so that all of the electrical functions may be controlled from either side. A heat gun holder 116 provides a convenient place to store a heat gun.

In a typical hoof trimming operation, the stall is transported to a site (e.g. a farm) by a towing vehicle and disconnected from the towing vehicle. Legs 41 are lowered by hydraulic cylinders 40 so that the stall is supported on wheels 42. Trailer wheels 44 are raised off the ground by hydraulic cylinder 45 and the stall is lowered as far as possible to the ground. Front gate 10 is set in the catching position with rear swing arm 55 in the raised position. An animal, for example a cow, is loaded head-first through the rear portion of the stall. The cow's head and neck pass between head rails 13 and the cow's shoulders push doors 11 into the closed position where front and rear catchers 70,30 lock the doors in place with the neck of the cow caught in the gap between the head rails. Rear swing arm 55 is brought down behind the cow by means of hydraulic cylinder 56. The belly band attached to adjustable support arms 50 is slung under the belly of the cow behind the front legs of the cow and the belly band is tightened by hydraulic cylinders 51 to support the cow. The entire stall is raised to a comfortable height by actuating hydraulic cylinders 40 attached to legs 41 of the stall. The front legs of the cow are placed on trimming platforms 60 and secured with the front leg holders. One of the rear legs of the cow is lifted off the floor and suspended with the rear leg support chain or strap. The hooves of the three legs are trimmed. The suspended rear leg is released lowered and the other rear leg is suspended and trimmed. All of the legs of the cow are then released and lowered and the belly band is removed from under the belly of the cow. The stall is lowered as far as possible by actuating hydraulic cylinders 40 attached to legs 41 of the stall. Hydraulic cylinder 21 is actuated to move slider arm 20 forward thereby pushing doors 11 to the half-release position. The cow is encouraged forward and the exiting cow pushes the doors open to the open position. The slider arm is automatically reset by hydraulic cylinder 21 and the doors are automatically reset to the catching position by the springs. The process is then repeated.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A hoof trimming stall comprising:
    a frame having a rear portion through which a four-legged hoofed animal may enter the stall and a front portion through which the animal may exit the stall;
    a front gate on the front portion of frame, the front gate having two pivotally mounted spaced-apart doors for swinging inwardly into the stall and outwardly away from the stall, the doors movable between
        a catching position in which the doors point inwardly for receiving a head and neck of the animal entering the stall in a gap between the spaced-apart doors,
        a closed position for holding the animal in the stall with the neck of the animal caught in the gap between the doors, and
        an open position in which the doors point outwardly for permitting the animal to exit the stall;
    a door lock/release mechanism having
        a slider arm movable forward and backward with respect to the frame,
        actuating means connected to the frame for moving the slider arm forward and backward,
        a rear catcher mounted on the slider arm for preventing the doors from moving from the closed position to the catching position,
        a front catcher mounted on the slider arm for preventing the doors from being opened by the animal when the doors are in the closed position, and
        a release mechanism for permitting the doors to move from the open position to the catching position; and,
    an automatic reset mechanism for automatically resetting the doors and door/lock release mechanism, the reset mechanism having
        a sensor for signaling the actuating means to move the slider arm backwards when the doors are in the open position to thereby reset the door lock/release mechanism, and
        a biasing means connected to the doors and the frame for biasing the doors from the open position to the catching position to thereby reset the doors.

2. The stall of claim 1, wherein the rear catcher is pivotally mounted on the slider arm and the release mechanism comprises a lift plate connected to the rear catcher for engagement with the front catcher.

3. The stall of claim 2, wherein the front catcher is pivotally mounted on the slider arm and the release element comprises a push plate connected to the front catcher for engaging the lift plate to release the rear catcher as the doors move from the open position to the catching position.

4. The stall of claim 3, wherein the doors comprise rollers mounted thereon to engage the rear catcher to permit movement of the doors without binding when the doors move from the catching position to the closed position.

5. The stall of claim 1, wherein the doors have a half-release position between the closed position and the open position.

6. The stall of claim 5, further comprising a controller for permitting selective activation of the actuating means for moving the slider arm and doors forward from the closed position to the half-release position, and the sensor signals the actuating means to move the slider arm backwards only after the doors are pushed past the half-release position.

7. The stall of claim 6 further comprising a floor and a floor lift for lifting the floor to raise the stall.

8. The stall of claim 7 further comprising a size-adjustable animal lift for supporting the animal in the stall.

9. The stall of claim 8, wherein the floor lift and the animal lift are separately controllable by separate worker/slave hydraulic cylinders.

10. The stall of claim 8 further comprising a rear swing arm for blocking the rear portion of the frame to help prevent the animal from backing out of the stall.

11. The stall of claim 1 further comprising wheels connected to the frame and a removable hitch to permit towing of the stall.

12. The stall of claim 11, wherein the wheels are mounted on an axle and the axle may be raised and lowered.

13. The stall of claim 1, wherein the actuating means is a hydraulic cylinder.

14. The stall of claim 1, wherein the biasing means comprises a spring.

15. The stall of claim 1, further comprising two front feet trimming platforms for supporting both front legs of the animal and a rear leg support for supporting one of the rear legs of the animal.

* * * * *